(12) United States Patent
Abe et al.

(10) Patent No.: US 8,450,448 B2
(45) Date of Patent: May 28, 2013

(54) THERMOSTABLE BIOPOLYESTER

(75) Inventors: Hideki Abe, Wako (JP); Yoshiharu Doi, Wako (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 13/360,583

(22) Filed: Jan. 27, 2012

(65) Prior Publication Data

US 2012/0136135 A1    May 31, 2012

Related U.S. Application Data

(62) Division of application No. 11/661,503, filed as application No. PCT/JP2005/015751 on Aug. 30, 2005, now abandoned.

(30) Foreign Application Priority Data

Aug. 31, 2004  (JP) .................................. 2004-251853

(51) Int. Cl.
*C08G 63/06* (2006.01)

(52) U.S. Cl.
USPC ......... 528/361; 424/78.37; 435/135; 528/354

(58) Field of Classification Search
USPC ................. 424/78.37; 435/135; 528/354, 361
See application file for complete search history.

(56) References Cited

U.S. PATENT DOCUMENTS

| | | | |
|---|---|---|---|
| 4,968,611 | A | 11/1990 | Traussnig et al. |
| 5,281,691 | A | 1/1994 | Hubbs et al. |
| 5,625,029 | A | 4/1997 | Hubbs et al. |
| 6,576,450 | B2 * | 6/2003 | Skraly et al. ............ 435/135 |
| 7,276,361 | B2 | 10/2007 | Doi et al. |
| 2001/0006802 | A1 | 7/2001 | Horowitz et al. |
| 2002/0141967 | A1 * | 10/2002 | Williams et al. .......... 424/78.37 |
| 2003/0032151 | A1 | 2/2003 | Honma et al. |
| 2006/0258833 | A1 | 11/2006 | Senda et al. |

FOREIGN PATENT DOCUMENTS

| | | |
|---|---|---|
| DE | 4215860 A1 | 11/1993 |
| DE | 19712702 A1 | 10/1998 |
| EP | 0355307 A2 | 2/1990 |
| EP | 1 245 682 A2 | 10/2002 |
| JP | 10-168175 A | 6/1998 |
| JP | 2002-510747 A | 4/2002 |
| WO | WO-93/23554 A1 | 11/1993 |
| WO | WO-94/00506 A1 | 1/1994 |
| WO | WO-2004/041936 A1 | 5/2004 |

OTHER PUBLICATIONS

Office Action dated Jul. 15, 2011 in corresponding EP Application No. 05 777 100.8.
Zhang, Y., et al., "Stereochemistry of the Ring-Opening Polymerization of (S)-β-Butyrolactone," Macromolecules, vol. 23, pp. 3206-3212 (1990).
Hori, Y., et al., "Ring-Opening Polymerization of Optically Active β-Butyrolactone Using Distannoxane Catalysts: Synthesis of High Molecular Weight Poly(3-hydroxybutyrate)," Macromolecules, vol. 26, pp. 5533-5534 (1993).
Haywood, G.W., et al., "The importance of PHB-synthase substrate specificity in polyhydroxyalkanoate synthesis by *Alcaligenes eutrophus*," Microbiol, Ltrs, vol. 57, pp. 1-6 (1989).
Kawaguchi, Y, et al., "Kinetics and Mechanism of Synthesis and Degradation of Poly(3-hyroxybutyrate) in *Alcaligenes eutrophus*," Macromolecules, vol. 25, pp. 2324-2329 (1992).
Kagaku Daijiten (Chemical Dictionary), Kyoritsu Shuppan Co., Ltd., vol. 2, pp. 364-365, (Jun. 30, 1960).
Office Action issued in corresponding Japanese Application No. 2006-532713 dated Apr. 17, 2012.

* cited by examiner

*Primary Examiner* — Gregory Listvoyb
(74) *Attorney, Agent, or Firm* — Birch, Stewart, Kolasch & Birch, LLP (57) ABSTRACT

A biopolyester which is poly(3-hydroxyalkanoate) or poly(3-hydroxyalkanoate) copolymer and has a reduced calcium content. It has improved thermal stability due to the reduced calcium content.

7 Claims, 6 Drawing Sheets

THERMOSTABLE BIOPOLYESTER

This application is a Divisional of U.S. application Ser. No. 11/661,503 filed on Feb. 27, 2007 (now abandoned), which was the National Stage application under 35 U.S.C. §371 of International Application Number PCT/JP2005/015751 filed on Aug. 30, 2005, which claimed priority under 35 U.S.C. §119(a)-(d) of Application Number 2004-251853 filed on Aug. 31, 2004 in Japan.

TECHNICAL FIELD

The present invention relates to a biopolyester with an improved thermal stability. Since biopolyesters are biodegraded and reduced into natural material circulation, they can be utilized as plastics capable of environment protection. Also, in medical fields, they can be used as implant materials and carriers for medicines that need not be recovered.

BACKGROUND ART

Biopolyesters are polymer materials produced by microorganisms from biological resources such as sugars and fatty acids. The polyesters have a unique property called biodegradability such that they are decomposed and assimilated by the action of microorganisms in the environment and are expected to be utilized as one of biodegradable polyesters, like aliphatic polyesters obtained by chemical synthesis. Poly (3-hydroxybutyrate), a representative example of the biopolyester, is produced with an enzyme of a microorganism, so that it consists of 100% of a structural unit having a stereocenter of the (R)-form ((R)-3-hydroxybutyrate); and the poly(3-hydroxybutyrate) is a polymer material that cannot be produced by chemical synthesis.

Also, the polyester has a feature that it has a melting temperature of 180° C. and hence is thermoformable. However, the biopolyester undergoes a reduction in molecular weight due to thermal decomposition reaction in a temperature region of 160° C. or more. The reduction in molecular weight causes a reduction in strength of material, so that this property is a great drawback to utilization of biopolymers. When considering melt-forming of biopolyesters, it is necessary to develop a methodology by which the reduction in molecular weight of the biopolyester can be minimized within the temperature region of up to 180° C., which is its melting point.

It has been reported that a main reaction of the thermal decomposition of a biopolyester is a molecular weight reduction due to random cleavage of its molecular chain (Non-Patent Document 1).

As a prior art relating to prevention of thermal decomposition reaction of a biopolyester that has a melting temperature and a thermal decomposition temperature close to each other, there has been used a method of adding a compound that shows a plasticizing effect to a sample and lowering the melting temperature of the sample. One example thereof is a method in which a low molecular weight compound is physically added to the sample (Non-Patent Document 2). However, a molding to which a low molecular weight compound is added has problems that the addition of the low molecular weight compound results in exhibiting a property (such as a reduction in melting temperature, a reduction in strength of material, or the like) that is different from an original property of the biopolyester itself and that elution of the additive during duration of use causes deterioration of performance.

Another method is synthesis of a copolyester that contains a different molecular structure that is chemically added to its molecular chain (Non-Patent Document 3). In this method, deterioration of performance with time during duration of use is not caused but a physical property different from that of a homopolymer is exhibited due to the copolymerization composition. Therefore, there is a problem that the performance expected for the homopolymer is lost.

In various synthetic polymers, residues of a polymerization catalyst (in particular, residual metals) are known to promote a thermal decomposition reaction of polymer materials in the process of hot forming (a reverse reaction of polymerization reaction). Accordingly, there have been established synthesis technologies and purification technologies that decrease a polymerization catalyst that is contained or remaining in the synthesized polymer material as much as possible.

On the other hand, biopolyesters produced by microorganisms are synthesized in the form of particles in cells of the microorganisms by polyester synthetic enzymes in the cells of the microorganisms. The produced biopolyesters have to be purified by solvent washing or solvent extraction to separate them from proteins such as polyester synthetic enzymes and other biomass.

Methods of separating biopolyesters thus far proposed include a method that comprises extracting a biopolyester from cells of a microorganism with a solvent into which the biopolyester is soluble and separating the solution from cell residues, and a method that comprises removing cellular substances other than the objective polymer by an enzyme treatment or the like. In the purification methods using solvents, chloroform or methylene chloride (Patent Document 1), pyridine (Patent Document 2), dioxane (Patent Document 3), and so on are used as extraction solvents. On the other hand, regarding the method that comprises removing the cellular substances other than the objective polymer using an enzyme or the like, a method of separating and purifying the objective polymer by treating microbial cells with an alkaline solution of sodium hypochlorite has been proposed as disclosed in Non-Patent Document 4. Also, in Non-Patent Document 5, there is disclosed a method that comprises adding lysozyme to a microbial cell suspension, sonicating the suspension, loading the sonicate on glycerol, and purifying the objective polymer by centrifugation due to a difference in specific gravity. In Patent Document 4, there are proposed various methods that are combinations of molecular weight reduction of nucleic acid-related substances by heat treatment, digestion with a protease such as alkalase, digestion using a surfactant such as sodium dodecyl sulfate, and so on. Further, a method that comprises a treatment with surfactant and diluted alkaline solution of sodium hypochlorite has been proposed.

However, with these methods, it is very difficult to purify biopolyesters with high purity. Further, various elements constitute various kinds of compounds in cells of microorganisms, so that it is very difficult to remove all the impurities from the biopolyesters. For the above-mentioned reasons, there have been made no studies to identify residues (in particular, residual metal ions) that promote thermal decomposition reaction of biopolyesters upon hot forming and to elucidate the effects thereof.

[Patent Document 1] JP 57-65193 A
[Patent Document 2] U.S. Pat. No. 3,044,942 A
[Patent Document 3] JP 63-198991A
[Patent Document 4] JP 60-145097 A
[Non Patent Document 1] Polym. Degrad. Stabil., 6 (1984) 127-134
[Non Patent Document 2] Japanese Journal of polymer science and technology 47 (1991) 221-226
[Non Patent Document 3] Phys. Technol., 16 (1985) 32-36
[Non Patent Document 4] J. Gen. Microbiology 19 (1958) 198-209
[Non Patent Document 5] J. Bacteriology 88 (1964) 60-71

DISCLOSURE OF THE INVENTION

It is an object of the present invention to provide a technology capable of decreasing molecular weight reduction of a biopolyester by thermal decomposition by removing a specified residue in cells that remains in the biopolyester to prepare a sample that can endure melt forming.

The inventors of the present invention have found that conventional biopolyesters contain a considerable amount of calcium, which is a residue that promotes thermal decomposition reaction upon hot forming. Also, they have found that starting temperature of the weight reduction of a sample in the process of elevating a temperature can be shifted higher by about 30° C. by reducing a content of calcium contained in a biopolyester such as poly(3-hydroxybutyrate), and they also found that retention of molecular weight of a sample relative to the initial molecular weight upon heating the sample to the range of 170° C. to 190° C., which is a melting temperature, can be greatly increased, and found that the rate of molecular weight reduction of a sample under an isothermal heating condition can be suppressed to about a half of a non-treated sample. Based on the above, the present invention has been completed.

That is, the present invention provides the followings.

(1) A biopolyester which is selected from poly(3-hydroxyalkanoate) and poly(3-hydroxyalkanoate) copolymer, wherein said biopolyester has a calcium content of 120 ppm or less.

(2) The biopolyester according to (1), wherein the biopolyester is poly(3-hydroxybutyrate).

(3) The biopolyester according to (1), wherein the biopolyester is poly(3-hydroxybutyrate)-(3-hydroxyvalerate).

(4) A method of producing a thermostable biopolyester, comprising removing calcium from poly(3-hydroxyalkanoate) or poly(3-hydroxyalkanoate) copolymer which is produced by a microorganism to obtain poly(3-hydroxyalkanoate) or poly(3-hydroxyalkanoate) copolymer having a reduced calcium content.

(5) The method according to (4), wherein the calcium is removed by dissolving the poly(3-hydroxyalkanoate) or the poly(3-hydroxyalkanoate) copolymer which is produced by a microorganism, and acidifying the obtained solution.

DESCRIPTION OF THE PREFERRED EMBODIMENTS

Hereinafter, the present invention will be explained in detail.

The biopolyester of the present invention is a biopolyester selected from poly(3-hydroxyalkanoate) and poly(3-hydroxyalkanoate) copolymer, the biopolyester having an increased thermal stability due to reduction of calcium content to 120 ppm or less. The calcium content of the biopolyester is preferably 100 ppm or less, more preferably 50 ppm or less. From the viewpoint of thermal stability of the biopolyester, the lower the calcium content of the biopolyester, the more preferable, and the content could be even 0. However, since the yield of the biopolyester may be decreased in the process of decreasing calcium, the calcium content is usually 3 ppm or more. The calcium content can be measured by atomic absorption photometry or the like.

Examples of the poly(3-hydroxyalkanoates) include those poly(3-hydroxyalkanoates) whose side chain bound to the carbon atom at the 3-position of the linear chain in the repeating unit is hydrogen or an alkyl group having about 1 to about 12 carbon atoms, specifically include poly(3-hydroxypropionate), poly(3-hydroxybutyrate), poly(3-hydroxyvalerate), and poly(3-hydroxyoctanoate), and among them, the poly(3-hydroxybutyrate) is more preferable.

Examples of the poly(3-hydroxyalkanoate) copolymer include copolymers of 3-hydroxybutyrate and another hydroxyalkanoate having 3 to 12 carbon atoms. Specific examples thereof include (3-hydroxybutyrate)-(3-hydroxypropionate) copolymer, (3-hydroxybutyrate)-(3-hydroxypropionate)-(4-hydroxybutyrate) copolymer, (3-hydroxybutyrate)-(3-hydroxyvalerate) copolymer, (3-hydroxybutyrate)-(3-hydroxyvalerate)-(3-hydroxyhexanoate)-(3-hydroxyheptanoate) copolymer, (3-hydroxybutyrate)-(3-hydroxyvalerate)-(3-hydroxyhexanoate)-(3-hydroxyheptanoate)-(3-hydroxyoctanoate) copolymer, (3-hydroxybutyrate)-(3-hydroxyhexanoate)-(3-hydroxyoctanoate) copolymer, (3-hydroxybutyrate)-(3-hydroxyvalerate)-(3-hydroxyheptanoate)-(3-hydroxyoctanoate) copolymer, (3-hydroxybutyrate)-(3-hydroxyvalerate)-(3-hydroxyhexanoate)-(3-hydroxyheptanoate)-(hydroxyoctanoate)-(3-hydroxynonanoate)-(3-hydroxydecanoate)-(3-hydroxyundecanoate)-(3-hydroxylaurate) copolymer, and a (3-hydroxybutyrate)-(4-hydroxybutyrate) coplymer, and among them, the (3-hydroxybutyrate)-(3-hydroxyvalerate) copolymer is more preferable.

The biopolyesters of the present invention can be produced from the above-mentioned poly(3-hydroxyalkanoates) or poly(3-hydroxyalkanoate) copolymers produced by microorganisms, as starting materials.

The poly(3-hydroxyalkanoates) or poly(3-hydroxyalkanoate) copolymers as starting materials can be obtained by allowing microorganisms belonging to *Alcaligenes, Pseudomonas, Bacillus, Azotobacter, Nocardia*, and so on to produce them, and performing extraction with an organic solvent, or the like. Specifically, for example, biopolyesters produced using *Pseudomonas* bacteria such as *Pseudomonas testosteroni*, *Pseudomonas delafieldii*, *Pseudomonas cepacia*, and *Pseudomonas acidovorans* as disclosed in JP-A 06-284892; biopolymers produced using *Alcaligenes* bacteria such as *Alcaligenes faecalis*, *Alcaligenes ruhlandii*, *Alcaligenes latus*, *Alcaligenes aquamarinus*, *Alcaligenes eutrophs*, *Alcaligenes denitrificans*, *Alcaligenes paradoxus*, and *Alcaligenes lipolytica* as disclosed in JP-A 05-023189, JP-A 06-145311, and JP-A 05-064592; and so on can be used. Also, biopolyesters produced using genetically modified microorganisms disclosed in JP-A 10-108682, JP-A 11-243956, and JP-A 2000-135083 can be used.

The biopolyesters of the present invention can also be produced by using commercially available biopolyesters produced by microorganisms, as starting materials. The poly(3-hydroxyalkanoates) that can be used as starting materials for the biopolyesters of the present invention have a number average molecular weight as measured by gel permeation chromatography (GPC) of, for example, 3,000 to 10,000,000, preferably 10,000 to 10,000,000, and more preferably 50,000 to 7,000,000. On the other hand, the poly(3-hydroxyalkanoate) copolymers that can be used as starting materials for the biopolyesters of the present invention have a number average molecular weight of, for example, 3,000 to 10,000,000, preferably 10,000 to 10,000,000, and more preferably 50,000 to 600,000.

The biopolyesters of the present invention can be obtained by removing calcium from the above-mentioned poly(3-hydroxyalkanoates) or poly(3-hydroxyalkanoate) copolymers as starting materials. While a method of removing calcium is not particularly limited, it is preferable to acidify a solution of biopolyester (preferably to pH 5 or less) so that calcium is released and removed, since it is expected that calcium exists as bound to the carboxy terminal of the biopolyester through an ionic bond. In order to acidify the solution, for example, organic acids such as acetic acid and propionic acid and inorganic acids such as hydrochloric acid and sulfuric acid can be used. Preferably, the removal of calcium can be performed by dissolving the biopolyester as the starting material into an organic solvent, adding acetic acid to the resultant organic solvent containing the biopolyester for reaction. Examples of the organic solvents include those organic solvents that can dissolve biopolyesters, specifically, chloroform, methylene chloride, 1,2-dichloroethane, and so on. Of those, chloroform is preferable. The biopolyester from which calcium is removed can be recovered by dropping the reaction mixture obtained by the above-mentioned reaction into an alcohol, recovering the precipitated biopolyester by filtration, washing it with an alcohol, and then drying it under reduced pressure.

The biopolyesters of the present invention have an improved thermal stability as compared with non-treated biopolyesters due to their reduced calcium content. For example, when the biopolyester of the present invention (subjected to a calcium reducing treatment) and a non-treated biopolyester are each isothermally retained at 180° C. and the degree of polymerization is measured to calculate thermal decomposition rates in accordance with the equation 1 described in the Examples described below for comparison, the biopolyester of the present invention desirably exhibits a thermal decomposition rate decreased by 10% or more, preferably 20% or more, or more preferably 50% or more relative to the thermal decomposition rate of a non-treated biopolyester.

EXAMPLES

Hereinafter, the present invention will be explained in more detail by examples. However, the present invention is not limited to the following examples.

Preparation of Samples and Evaluation of the Structures Thereof.

Polyester produced by a microorganism was dissolved into chloroform to prepare 2% (wt/vol) solution. 1% (vol/vol) equivalent of acetic acid based on the biopolyester solution was added into this solution. The resultant mixed solution was stirred at room temperature for 3 to 12 hours. After the reaction was allowed to proceed for a predetermined time, the mixed solution was dropped into 10 times volume of an alcohol. The dropping of the solution resulted in precipitation of the biopolyester that is insoluble into the alcohol and dissolution of acetic acid into the alcohol. The precipitated biopolyester was recovered by filtration, washed with alcohol several times, and then dried at room temperature under reduced pressure until it showed a constant weight.

The molecular weight and molecular weight distribution of the obtained sample were determined by gel permeation chromatography (GPC). Also, the thermal properties of the biopolyester were evaluated using a differential scanning calorimeter (DSC).

Shimadzu 10A GPC system (manufactured by Shimadzu Corporation) equipped with Shimadzu RID-10A differential refractive index detector (manufactured by Shimadzu Corporation) was used as the GPC apparatus. Separation columns Shodex K-80M and Shodex K-802 manufactured by Showa Denko K.K. serially connected to each other were used. Measurement was performed at a column temperature of 40° C. and a flow rate of 0.8 ml/min and by using chloroform as a solvent. The calibration curve for measuring a molecular weight was prepared by using a low polydisperse polystyrene for measuring molecular weight. By utilizing the calibration curve, molecular weights of samples were calculated in terms of polystyrene. The polyester was dissolved into chloroform to a concentration of 1 mg/ml and filtered through a PTFE filter having a pore diameter of 0.45 μm to prepare a sample for GPC measurement, which was subjected to the molecular weight measurement.

Pyris-1 DSC system (manufactured by Perkin-Elmer) equipped with a liquid nitrogen supply system was used as the DSC apparatus. Melting temperatures (Tm) were obtained by charging about 3 mg of a sample which was weighed precisely into an aluminum pan and performing a fast scan from room temperature to 200° C. at a temperature elevation rate of 20° C./min in a nitrogen atmosphere (at a flow rate of 30 ml/min). The glass transition temperature (Tg) was measured by quenching the completely molten sample by fast scan to −100° C. and elevating the temperature of the sample from −100° C. to 200° C. at a temperature elevation rate of 20° C.

The quantification of metal ions (Ca and Zn) in the sample was performed by atomic absorption photometry.

Evaluation of Heat Resistance

The heat resistance of biopolyesters was evaluated by two methods, i.e., measurement of a change in weight in the process of temperature elevation and measurement of a change in molecular weight in the process of isothermal retention. The change in weight in the process of temperature elevation was measured using a thermogravimetric apparatus by elevating a temperature of sample from room temperature to 500° C. at a rate of 10° C./min in a dry nitrogen atmosphere. In the measurement of the change in molecular weight in the isothermal process, the temperature of sample was measured similarly using a thermogravimetric apparatus by elevating the temperature of the sample from room temperature to a predetermined temperature at a rate of 30° C./min in a dry nitrogen atmosphere, isothermally retaining the sample at that temperature for a predetermined time, taking out the sample to room temperature after the predetermined retention time passed, and measuring the molecular weight of the sample by GPC. In both the measurements, about 5 mg of the sample was weighed precisely and used. TG/DTA 220U system manufactured by Seiko Instruments was used as the thermogravimetric apparatus.

Implementation Result 1

Commercially available poly(3-hydroxybutyrate) (PHB) (manufactured by Sigma-Aldrich Corporation) produced by a microorganism was used as a biopolyester. To remove impurities contained in the commercially available polyester, purification of the polyester was performed. First, 1 g of PHB was dissolved into 100 ml of chloroform and filtered through a PTFE filter having a pore diameter of 0.45 μm to remove chloroform-insoluble solids. The obtained solution was dropped into methanol or n-hexane to precipitate PHB. The precipitated PHB was recovered by filtration and washed with methanol or n-hexane several times and dried under reduced pressure at room temperature until it showed a constant weight. 1 g of the purified PHB was dissolved into 50 ml of chloroform and then 1 ml of acetic acid was added to the resultant solution. After the mixed solution was stirred at room temperature for 24 hours, the mixed solution was dropped into methanol to obtain PHB.

Table 1 shows the molecular weight and molecular weight distribution of PHB before and after the purification treatment. No changes in molecular weight and molecular weight distribution due to the purification treatment were observed. Measurement of the calcium ions in the sample before and after the purification revealed that the non-treated PHB contained 420 ppm of calcium and the purification-treated PHB contained 103 ppm of calcium. Therefore, it was shown that the purification treatment reduced the calcium content in the biopolyester.

Table 2 shows the thermal properties of the purified PHB as determined by DSC. The melting temperature (Tm) and glass transition temperature (Tg) of the purification-treated PHB were observed as 176° C. and 3° C., respectively. These values well coincided with those of the non-treated PHB.

Figure 1:
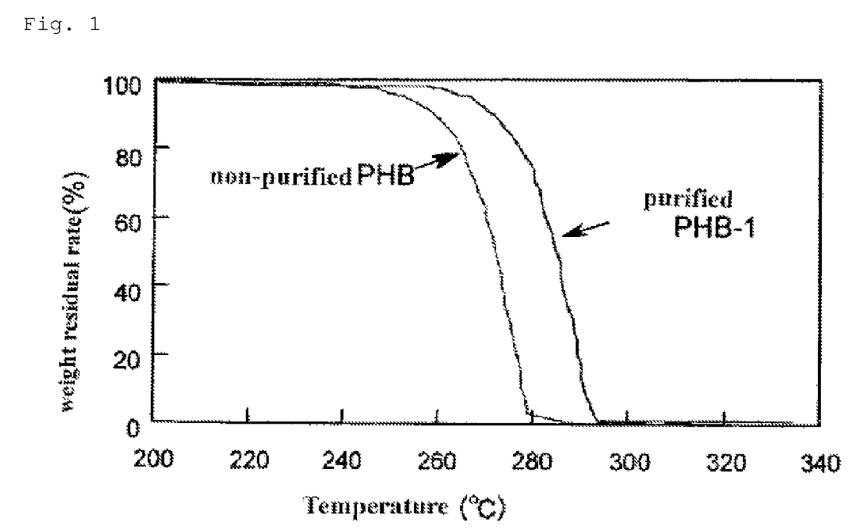
FIG. 1 is a diagram illustrating a thermogravimetric change curve before and after purification treatment of PHB.

FIG. 1 also shows the results of measurement of a change in weight in the process of temperature elevation of the obtained purification-treated PHB. For comparison, FIG. 1 also shows a thermogravimetric change curve of the non-treated PHB. In the case of the non-treated PHB, the weight decrease started at about 240° C. and the weight became zero at 280° C. On the other hand, in the case of the purification-treated PHB, the temperature at which the weight decrease started was about 260° C., shifting by about 20° C. toward the high temperature side as compared with the non-treated sample.

Figure 2:
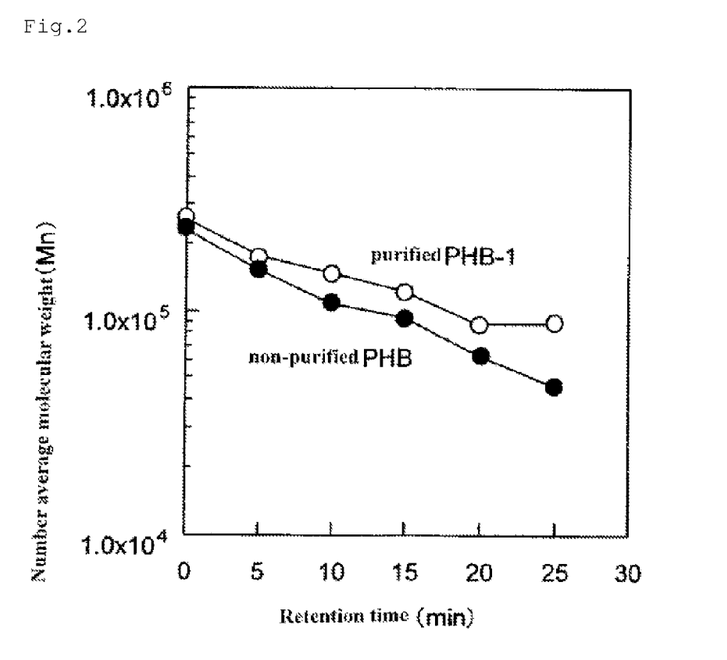
FIG. 2 is a diagram illustrating a change in molecular weight of purified PHB in the process of isothermal retention at 180° C.

FIG. 2 shows a time course of molecular weight of the sample when the purification-treated PHB was isothermally retained at 180° C. For comparison, FIG. 2 also shows the data of the non-treated PHB. The sample was heated from room temperature to 180° C. at a rate of 30° C./min, and the number average molecular weight (Mn) of the sample at the point when the temperature reached 180° C. was 243,000 for the non-treated PHB and 273,000 for the purification-treated PHB. In both of the samples, the molecular weights were decreased as compared with the initial molecular weights of 280,000 (non-treated PHB) and 276,000 (purification-treated PHB), respectively. This is because the thermal decomposition reaction had already proceeded gradually by the time when the temperature of the sample reached 180° C. to decrease the molecular weight of the sample. However, it was confirmed that the purification-treated PHB (molecular weight retention rate 98.94%) exhibited a smaller ratio of molecular weight decrease than that of the non-treated PHB (molecular weight retention ratio 86.8%). It was observed that each of the samples showed a decrease in molecular weight with a lapse of retention time when it was isothermally retained at 180° C. The rate of molecular weight decrease was calculated based on the following reaction formula:

$$1/Pn(t)=1/Pn(0)+kd\times t$$

(Pn(0): degree of polymerization at the time when the temperature reached the retention temperature, Pn(t): degree of polymerization at the retention time t, kd: rate constant, degree of polymerization (Pn)=molecular weight (Mn)/mass of monomer unit (86.1)).

Figure 3:
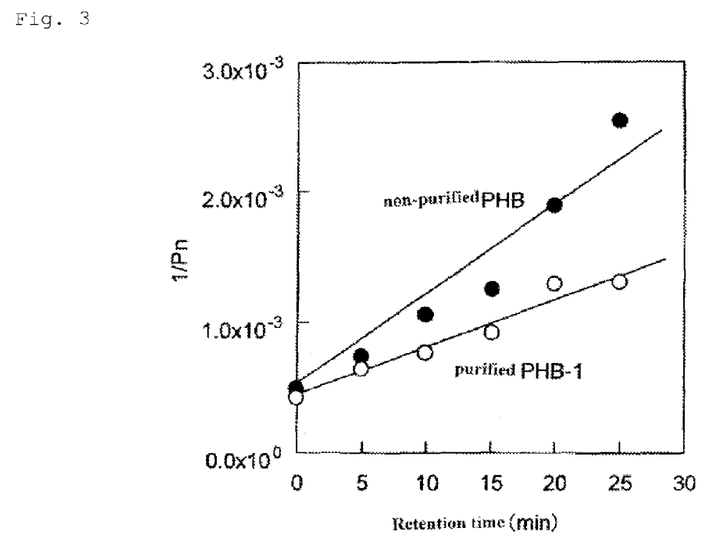
FIG. 3 is a diagram illustrating a change in degree of polymerization of PHB upon isothermal retention at 180° C.

FIG. 3 shows the relationship between isothermal retention time at 180° C. and degree of polymerization (Pn) of a sample. Linearity was observed between a reciprocal of the degree of polymerization and the retention time, and the rate constant (kd) of thermal decomposition rate was calculated from the inclination of the line. The rate constants of the non-treated PHB and the purification-treated PHB were observed as kd=7.53×10$^5$ (1/min) and kd=4.17×10$^{-5}$ (1/min), respectively. As a result, it follows that the thermal decomposition rate of PHB at 180° C. was reduced to about a half by performing the purification treatment.

Figure 4:
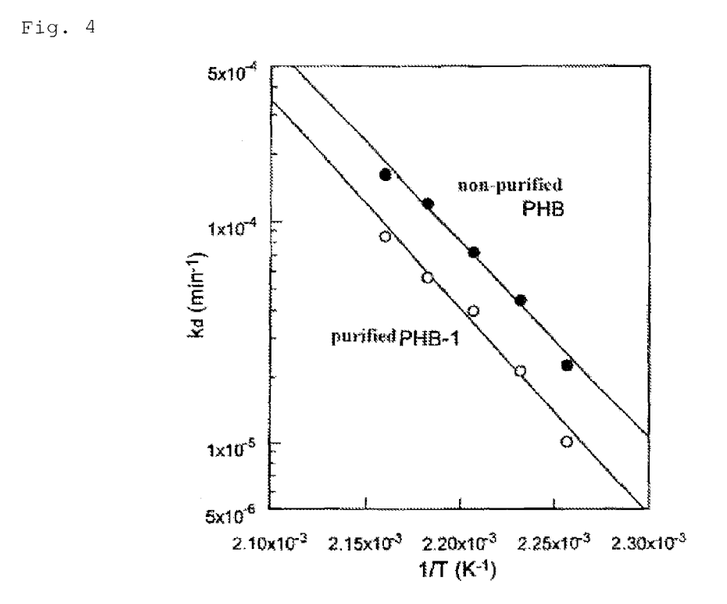
FIG. 4 is a diagram illustrating rate constants of thermal decomposition rates of PHB upon isothermal retention at predetermined temperatures (170° C., 175° C., 180° C., 185° C., and 190° C.)

Further, decomposition rate constant kd in a similar isothermal retention process was obtained for each of the temperatures of 170° C., 175° C., 185° C., and 190° C. FIG. 4 shows the relationship of the decomposition temperature (T) versus the rate constant (kd). At either of the temperatures, the decomposition rate of the purification-treated PHB was smaller than that of the crude PHB.

Implementation Result 2

Commercially available PHB was used as a biopolyester. The purification operation (calcium removing operation) performed in Implementation Result 1 was repeated twice. Table 1 shows the molecular weight and molecular weight distribution of PHB before and after the purification treatment. No changes in molecular weight and molecular weight distribution were observed after twice of the purification treatment. Measurement of the amount of calcium ion after the purification indicated that the amount of calcium decreased to 37 ppm. The melting temperature (Tm) and glass transition temperature (Tg) of the PHB which was purified twice well coincided with those of the non-treated PHB.

Figure 5:
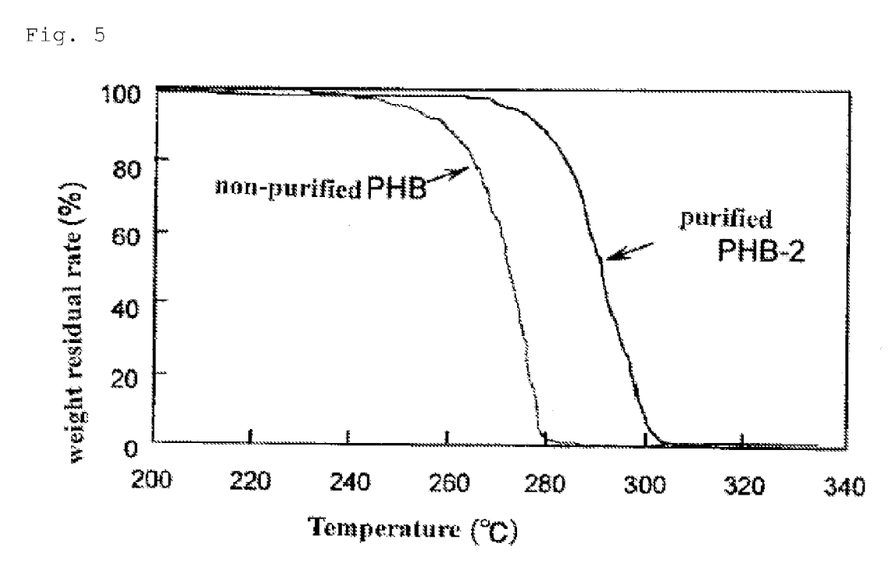
FIG. 5 is a diagram illustrating a thermogravimetric change curve of PHB after 2 cycles of purification.

FIG. 5 shows the results of measurement of a change in weight in the process of temperature elevation of the obtained purification-treated PHB. In the case of the PHB subjected to twice of the purification treatment, the temperature at which weight decrease started was about 270° C., which was shifted by about 30° C. toward the higher temperature side as compared with that of the non-treated sample.

Figure 6:
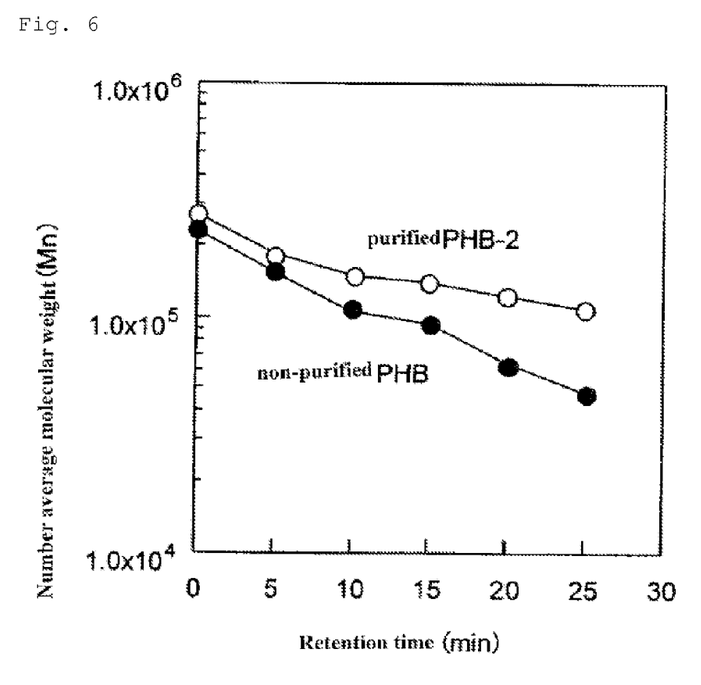
FIG. 6 is a diagram illustrating a change in molecular weight of the twice-purified PHB upon isothermal retention at 180° C.
Figure 7:
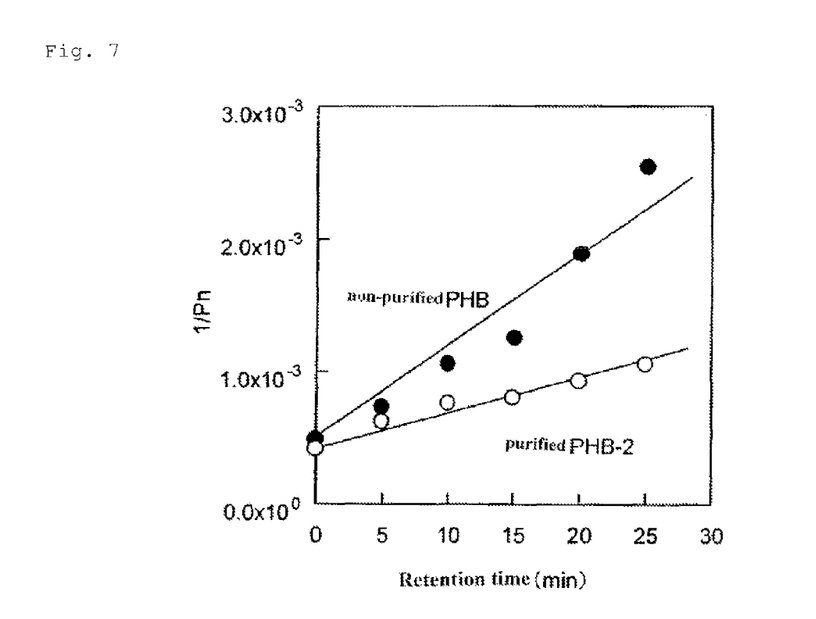
FIG. 7 is a diagram illustrating a change in degree of polymerization of the twice-purified PHB upon isothermal retention at 180° C.

FIG. 6 shows a time course of molecular weight when the purification-treated PHB was isothermally retained at 180° C. The purification-treated PHB was heated from room temperature to 180° C. at a rate of 30° C./min, and the number average molecular weight (Mn) at the point when the temperature reached 180° C. was 282,000 for the purification-treated PHB. The initial molecular weight of the twice purification-treated PHB was 280,000. This indicated that the twice purification-treated PHB (molecular weight retention ratio 99.3%) had a smaller ratio of decrease in molecular weight than that of the non-treated PHB. When the sample was isothermally retained at 180° C., a decrease in molecular weight of the sample was observed with lapse of the retention time. FIG. 7 shows the relationship between the isothermal retention time at 180° C. and the degree of polymerization (Pn) of the sample. The rate constant (kd) of thermal decomposition rate calculated from the inclination of the line was kd=2.98×10$^{-5}$ (1/min) for the purification-treated PHB. As a result, it follows that the thermal decomposition rate of PHB at 180° C. was further reduced by performing the purification treatment twice.

Confirmation Result 1

A sample obtained by adding a predetermined amount of calcium to the purified PHB obtained in Implementation Result 2 was used. 1 g of purified PHB was dissolved into 50 ml of chloroform and then a suitable amount of a methanol solution containing 1 mg/ml of calcium chloride was added thereto and the resultant mixture was stirred at room temperature for 2 hours. After the stirring, the mixed solution was spread over a glass-made Petri dish and the solvent was evaporated to form a film.

Figure 8:
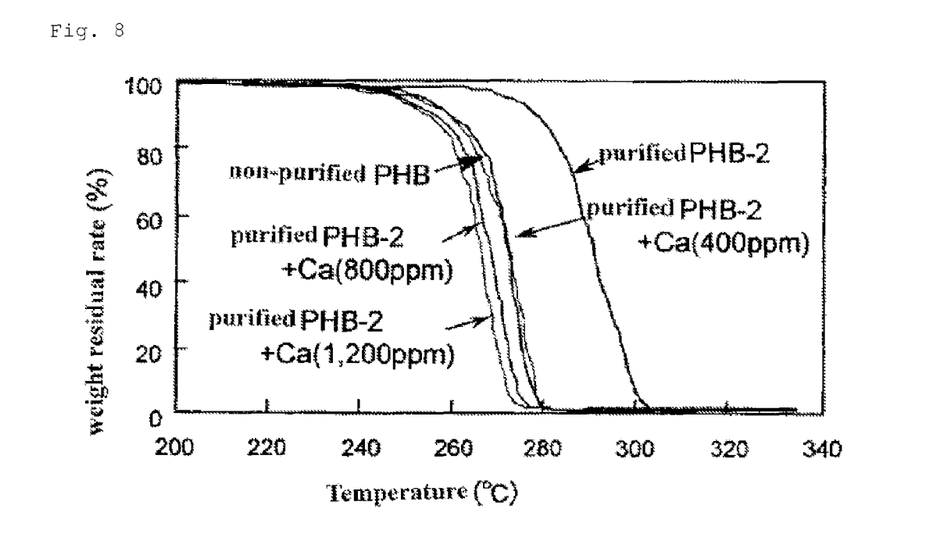
FIG. 8 is a diagram illustrating thermogravimetric change curves of PHB after purification and addition of calcium ion.

FIG. 8 shows the results of measurement of a change in weight of the obtained calcium-added PHB in the process of temperature elevation. In the case of the PHB to which 400 ppm calcium was added, the temperature at which a weight decrease started was about 240° C., which was shifted by about 30° C. toward the lower temperature side as compared with the PHB sample to which no calcium was added. It was confirmed that the result well coincided with the result of weight decrease of the purification-non-treated sample (calcium content: 420 ppm).

In addition, the PHB samples to which 800 ppm and 1,200 ppm of calcium was added respectively exhibited the weight decrease starting at about 230° C., which was further shifted toward the lower temperature side.

The above-mentioned results showed that the calcium ion contained in the PHB sample served to promote the thermal decomposition reaction of PHB.

Comparison Result 1

A sample obtained by adding a predetermined amount of zinc to the purified PHB obtained in Implementation Result 2 was used. 1 g of the purified PHB was dissolved into 50 ml of chloroform and then a suitable amount of a methanol solution containing 1 mg/ml zinc chloride was added thereto and the resultant mixture was stirred at room temperature for 2 hours. After the stirring, the mixed solution was spread over a glass-made Petri dish and the solvent was evaporated to form a film.

Figure 9:
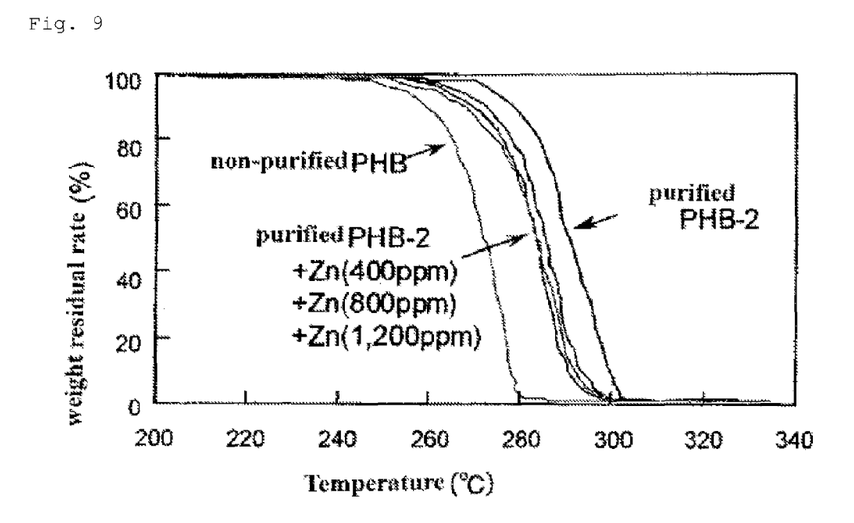
FIG. 9 is a diagram illustrating thermogravimetric change curves of PHB after purification and addition of zinc ion.

FIG. 9 shows the results of measurement of a change in weight of the obtained zinc-added PHB in the process of temperature elevation. In the case of the PHB to which 400 ppm of zinc was added, the temperature at which a weight decrease started was about 260° C., which was shifted by about 10° C. toward the lower temperature side as compared with the PHB sample to which no zinc was added. However, when zinc was added 800 ppm and 1,200 ppm, respectively, the temperature at which weight decrease of the sample started did not go down any further and showed substantially the same behavior.

The above-mentioned results indicated that while zinc ion contained in the PHB sample served to promote the thermal decomposition reaction of PHB, its effect was very small as compared with that of calcium ion.

TABLE 1

Molecular weight and Ca content of samples

| Sample | Number average molecular weight | Molecular weight distribution | Ca Content (ppm) | Memo |
| --- | --- | --- | --- | --- |
| Non-purified PHB | 280,000 | 2.2 | 420 | Note 1 |
| Purified PHB-1 | 276,000 | 2.2 | 103 | Note 2 |
| Purified PHB-2 | 282,000 | 2.1 | 37 | Note 3 |
| Purified PHB-2 + Ca (400 ppm) | 282,000 | 2.1 | 400 | Note 4 |
| Purified PHB-2 + Ca (800 ppm) | 282,000 | 2.1 | 800 | Note 4 |
| Purified PHB-2 + Ca (1200 ppm) | 282,000 | 2.1 | 1,200 | Note 4 |

TABLE 2

Melting temperature and glass transition temperature of samples

| Sample | Melting temperature (° C.) | Glass transition (° C.) | Ca Content (ppm) |
| --- | --- | --- | --- |
| Non-purified PHB | 178 | 3 | 420 |
| Purified PHB-1 | 176 | 3 | 103 |
| Purified PHB-2 | 176 | 3 | 37 |
| Purified PHB-2 + Ca (400 ppm) | 177 | 3 | 400 |
| Purified PHB-2 + Ca (800 ppm) | 176 | 3 | 800 |
| Purified PHB-2 + Ca (1200 ppm) | 176 | 3 | 1,200 |

Implementation Result 3

Commercially available poly(3-hydroxybutyrate-co-3-hydroxyvalerate) (3-hydroxyvalerate fraction=22 mol %) (PHBV22) (manufactured by Sigma-Aldrich Corporation) was used as a biopolyester. In the same manner as in Implementation Result 1, 1 g of PHBV22 was dissolved into 50 ml of chloroform and then 1 ml of acetic acid was added to the resultant solution. After the mixed solution was stirred at room temperature for 24 hours, the mixed solution was dropped into methanol to obtain PHBV22. In the same manner as in Implementation Result 2, this operation was repeated twice. Table 3 shows the molecular weight and molecular weight distribution of PHBV22 before and after the purification treatment. No changes in molecular weight and molecular weight distribution due to the purification treatment were observed. Measurement of the calcium ion in the sample before and after the purification revealed that the non-treated PHBV22 contained 480 ppm of calcium and the purification-treated PHBV22 contained 53 ppm of calcium. Table 4 shows the thermal properties of the purified PHBV22 as determined by DSC. The melting temperature (Tm) and glass transition temperature (Tg) of the purification-treated PHBV22 were observed at 135° C. and −3° C., respectively. These values well coincided with those of the non-treated PHB.

Figure 10:
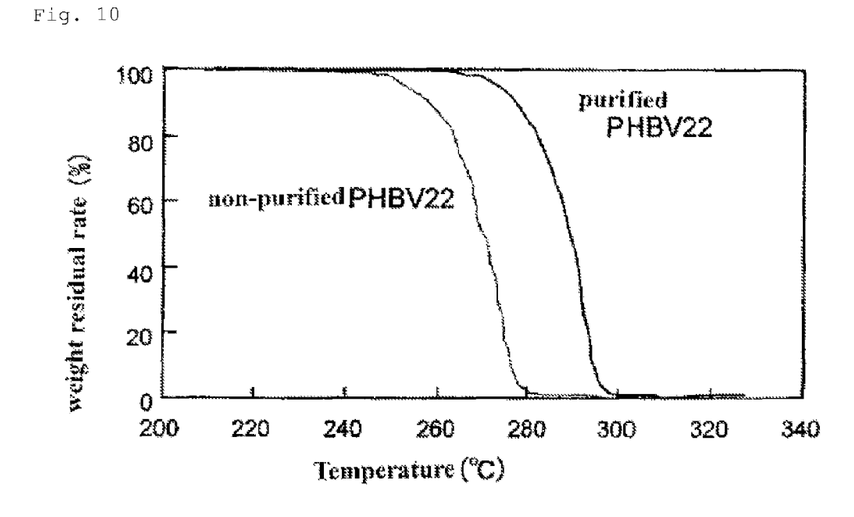
FIG. 10 is a diagram illustrating a thermogravimetric change curve of PHBV22 subjected to purification treatment.

FIG. 10 shows the results of measurement of a change in weight in the process of temperature elevation of the obtained purification-treated PHBV22. In the case of the non-treated PHBV22, the weight decrease started at about 245° C. and the weight became zero at 280° C. On the other hand, in the case of the purification-treated PHBV22, the temperature at which the weight decrease started was about 265° C., shifting by about 20° C. toward the high temperature side as compared with the non-treated sample.

Figure 11:
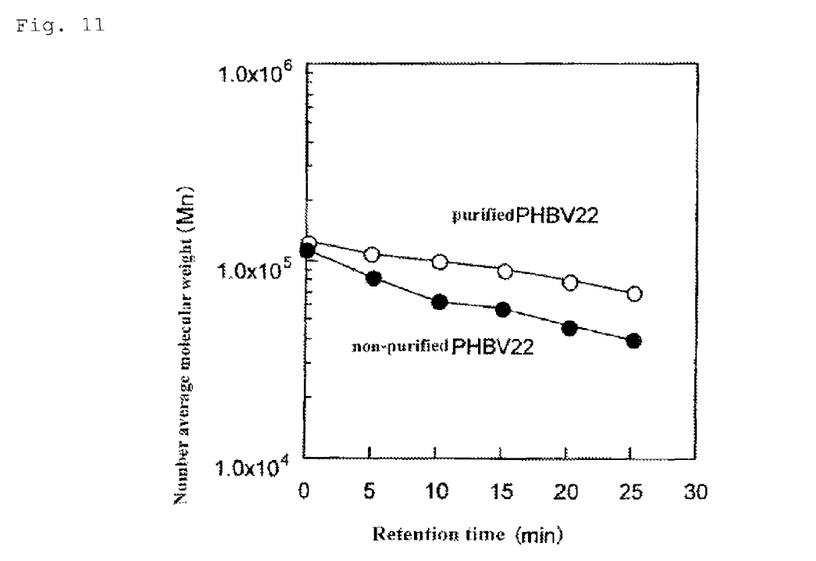
FIG. 11 is a diagram illustrating a change in molecular weight of purified PHBV22 upon isothermal retention at 180° C.
Figure 12:
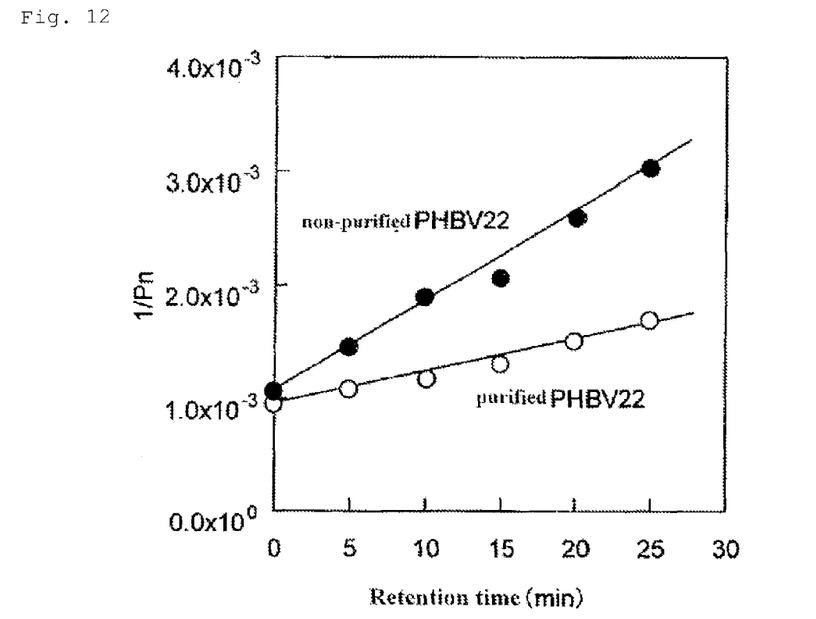
FIG. 12 is a diagram illustrating a change in degree of polymerization of purified PHBV22 upon isothermal retention at 180° C.

FIG. 11 shows a time course of molecular weight of the sample when the purification-treated PHBV22 was isothermally retained at 180° C. The purification-treated PHBV22 was heated from room temperature to 180° C. at a rate of 30° C./min, and the number average molecular weight (Mn) at the point when the temperature reached 180° C. was 112,000 for the non-treated PHBV22 and 125,000 for the purification-treated PHBV22 The initial molecular weights were 130,000 for the non-treated PHBV22 and 128,000 for the purification-treated PHBV22, respectively. It was confirmed that the purification-treated PHBV22 (molecular weight retention ration 97.7%) exhibited a smaller ratio of molecular weight decrease than that of the non-treated PHBV22 (molecular weight retention ratio 84.1%). It was observed that each of the samples showed a decrease in molecular weight with a lapse of retention time when it was isothermally retained at 180° C. FIG. 12 shows the relationship between isothermal retention time at 180° C. and degree of polymerization (Pn) of a sample. The rate constant (kd) of thermal decomposition rate calculated from the inclination of the line was $kd=8.21\times10^{-5}$ (1/min) for the non-treated PHBV22 and $kd=3.23\times10^{-5}$ (1/min) for the purification-treated PHBV22. As a result, it follows that the thermal decomposition rate of PHBV22 at 180° C. was reduced to about a half by performing the purification treatment.

TABLE 3

Molecular weight and Ca content of samples

| Sample | Number average molecular weight | Molecular weight distribution | Ca Content (ppm) | Memo |
|---|---|---|---|---|
| Non-purified PHBV22 | 130,000 | 2.0 | 480 | Note 1 |
| Purified PHB22 | 128,000 | 2.1 | 53 | Note 2 |

TABLE 4

Melting temperature and glass transition temperature of samples

| Sample | Melting temperature (° C.) | Glass transition (° C.) | Ca Content (ppm) |
|---|---|---|---|
| Non-purified PHBV22 | 134 | −3 | 480 |
| Purified PHB22 | 135 | −3 | 53 |

INDUSTRIAL APPLICABILITY

According to the present invention, decrease in molecular weight of biopolyesters upon hot forming and deterioration of their performance during use can be prevented and moldings can be provided without changing the original properties of the biopolyester itself.

The invention claimed is:

1. A method of producing a thermostable biopolyester, comprising:
   dissolving poly(3-hydroxyalkanoate) or poly(3-hydroxyalkanoate) copolymer which is produced by a microorganism and which consists of 100% of (R)-3 hydroxyalkanoate being a structural unit having a stereocenter of (R)-form into an organic solvent and acidifying the obtained solution, thereby removing calcium from the poly(3-hydroxyalkanoate) or the poly(3-hydroxyalkanoate) copolymer to obtain poly(3-hydroxyalkanoate) or poly(3-hydroxyalkanoate) copolymer having a calcium content of 120 ppm or less.

2. The method of claim 1, wherein the number average molecular weight of the thermostable biopolyester is from 276,000 to 7,000,000.

3. The method of claim 1, in which the thermostable biopolyester is collected by adding the acidified organic solvent solution into an alcohol to form a precipitate, and recovering the precipitate.

4. The method of claim 1 in which the organic solvent is chloroform.

5. The method of claim 3 in which the organic solvent is chloroform.

6. The method of claim 3 in which the alcohol is methanol.

7. The method of claim 5 in which the alcohol is methanol.

* * * * *